3,451,540
DISPOSABLE MIXING CAPSULE
Walter Kulischenko, Staten Island, N.Y., assignor, by mesne assignments, to Pennsalt Chemicals Corporation, Philadelphia, Pa., a corporation of Pennsylvania
Filed Dec. 12, 1967, Ser. No. 690,007
Int. Cl. B65d 79/00, 1/04
U.S. Cl. 206—47                    10 Claims

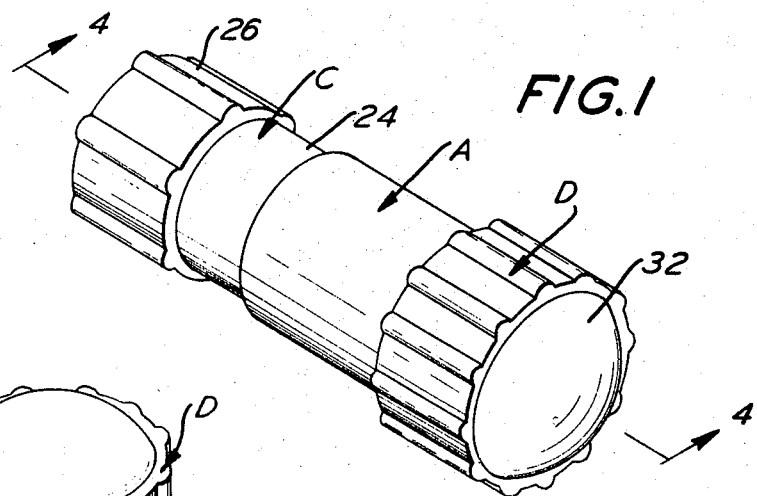
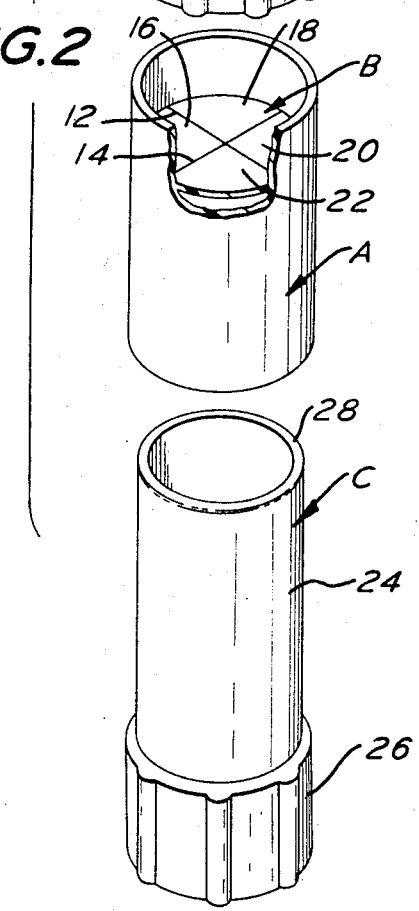
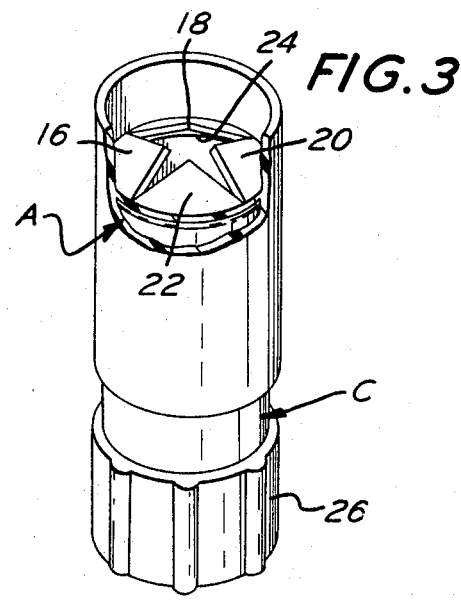

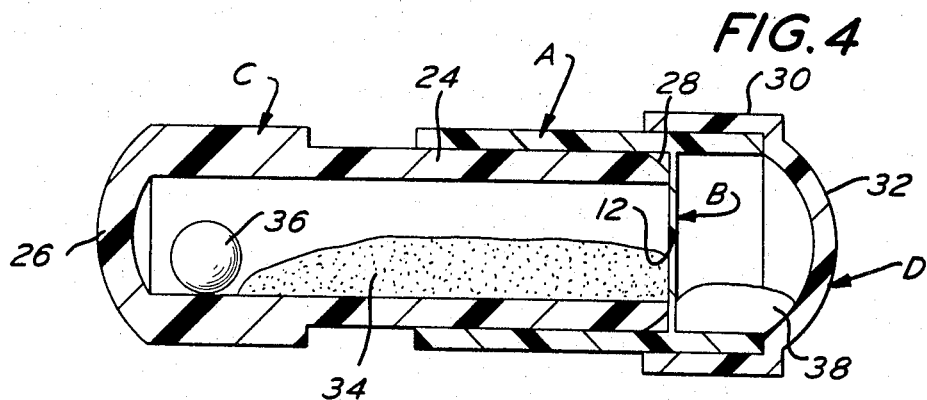
FIG. 4
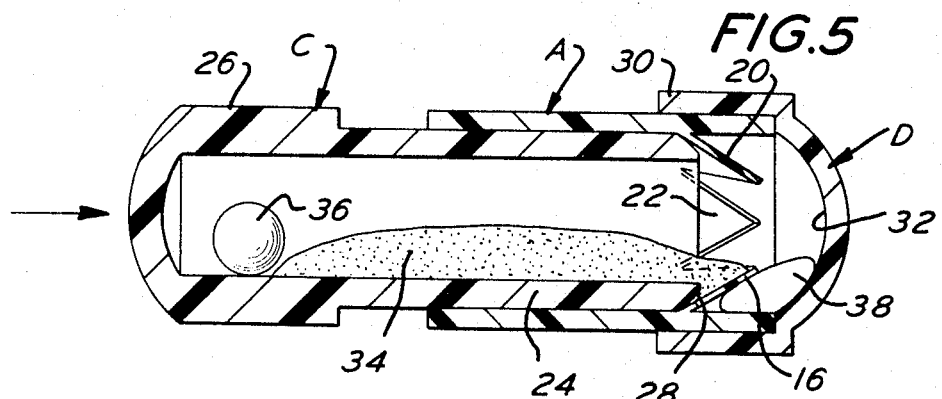
FIG. 5
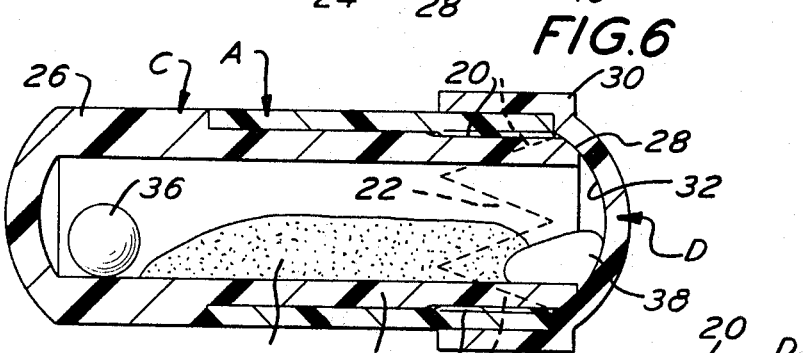
FIG. 6
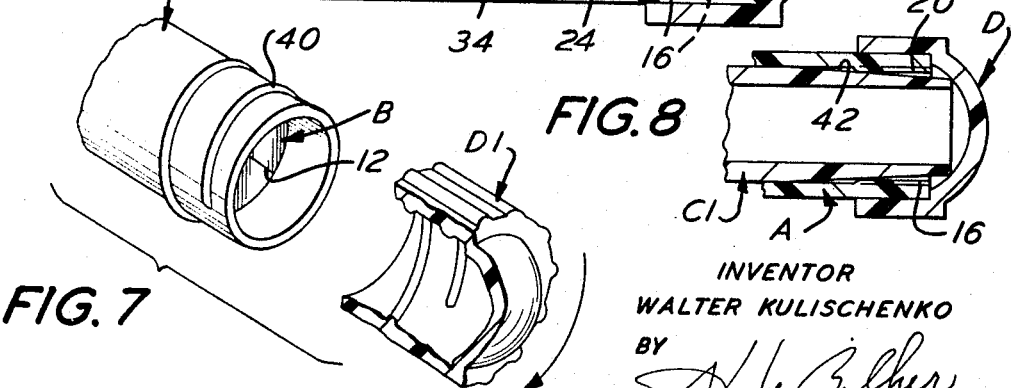
FIG. 7
FIG. 8
INVENTOR
WALTER KULISCHENKO
BY
*Hanley Bilker*
ATTORNEY United States Patent Office 3,451,540
Patented June 24, 1969

ABSTRACT OF THE DISCLOSURE

Mixing capsule for separate storage of ingredients comprising a pair of telescoping hollow members, one of which has a transverse partition with pre-scored weakened zones symmetrically disposed in the central portion. When the members are compressibly urged toward each other, the marginal edge of the proximal end of one hollow member causes the partition to rupture in tension, and the ruptured segments are captured in the annular space between the telescoped members to permit intermixing and trituration of the ingredients without interference.

Brief summary of the invention

This invention relates to a disposable mixing capsule for separate storage of ingredients such as a dental preparation of silver powder and mercury. These ingredients are stored and shipped in separate compartments within the capsule and when ready for use by the dentist are brought into contact with each other and triturated to form an amalgum.

Heretofore, capsules which used a partition for separately storing ingredients either employed a puncturing device for piercing the partitional membrane or a cutting or shearing member to remove the membrane entirely. While the puncturable system was satisfactory to allow admixture of the previously separated ingredients, it may be readily seen that the punctured petals of the membrane seriously impeded trituration of the now partially commingled ingredients. Similarly, where the membrane was completely sheared at its marginal edges, for example, as shown in English Patent No. 1,774,258, the sheared membrane became entrapped with the ingredients themselves so as to interfere with the ability of the ingredients to come into intimate contact with each other.

In the past where the partitional membrane was to be sheared, it was the necessity to utilize a shearing device in or on one of the two telescoping members. This created an additional problem since shearing requires a large force per unit area. Prior devices utilized a biased circumferential blade or cutting edge with a piercing point on one of the members to permit starting of the cut itself. Where the marginal edge on the cutting member was biased or skewed to effect beginning of the cutting action, it posed a problem in forming a seal against its abutting cap when the two members were fully telescoped. As a consequence, it was necesary to utilize additional sealing flanges to prevent the material being triturated from entering into the annular space between the two telescoping members or otherwise escaping. Where the sheared membrane was allowed to remain attached at a small point or area in non-completely sheared disposition to prevent its dropping into the chamber, the partially sheared membrane became entrapped within the annular space between the two telescoped members. However, since almost all of the membrane was entrapped at one side of the capsule, this produced an off-set or cocking of the two telescoped members which similarly interferred with the sealing arrangement.

It is therefore an object of this invention to provide a disposable mixing capsule for separating storing ingredients in which all portions of the previously separated contents may be brought into intimate contact with each other for efficient intermixing and trituration.

Another object of this invention is to provide a disposable mixing capsule in which a partitional diaphragm is employed in a manner such that its elements are ruptured into symmetrical segments which are evenly captured in the annular space between the telescoped members to permit intermixing and trituration of the substances without interference.

Still another object of this invention is to provide a disposable mixing capsule having a transverse partition with pre-scored weakened zones symmetrically disposed in the central portion thereof to allow rupture into equal segments when the two portions of the capsule are telescoped with respect to each other.

Yet another object of this invention is to provide a disposable mixing capsule in which the stresses are equally distributed during telescoping of the two members with respect to each other thereby allowing efficient sealing.

A still further object of this invention is to provide a disposable mixing capsule with telescoping elements in which the rupturing member for the partitional diaphragm is the edge of one of the two telescoping members.

Yet another object of this invention is to provide a disposable mixing capsule in which there will be no ingredient loss.

Other objects of this invention are to provide an improved device of the character described which is easily and economically produced, sturdy in construction, and highly efficient and effective in operation.

Brief description of the figures

With the above and related objects in view, this invention consists of the details of construction and combination of parts as will be more fully understood from the following detailed description when read in conjunction with the accompanying drawings, in which:

FIGURE 1 is a perspective view of a mixing capsule embodying this invention,

FIGURE 2 is an exploded view thereof, and partly broken away,

FIGURE 3 is a perspective view, and partly broken away, showing the partitional membrane being ruptured, FIGURE 4 is a sectional view taken along lines 4—4 of FIGURE 1, FIGURE 5 is a sectional view showing the disposition of the mixing capsule immediately after rupturing of the partitional membrane, FIGURE 6 is a sectional view showing the mixing capsule after the two membranes are fully telescoped, FIGURE 7 is a fragmentary exploded view of another embodiment of the mixing capsule, and FIGURE 8 is a fragmentary sectional view of still another embodiment of this invention.

Detailed description

Referring now in greater detail to the drawings in which similar reference characters refer to similar parts, this invention comprises a first hollow member, generally designated as A, a partitional membrane B transversely disposed intermediate the ends of the tubular member, a second hollow member, generally designated as C, and a cap D detachably secured to the distal end of the first member.

Preferably, the entire capsule is molded of a suitable plastic composition, such as polyethylene. The member A may be tubular in configuration in the manner of a conventional capsule although there is no reason why an ovate or other arcuate cross-section might not be employed. As shown in FIGURES 2 and 3, the partitional diaphragm or membrane B is integrally molded intermediate the ends of the member A. As illustrated, the membrane B is formed closer to one end in order to permit a larger quantity of ingredients to be encapsulated in one chamber to suit the needs of a particular formulation. A pair of intersecting prescored lines or depressions 12 and 14 are formed in the membrane B to define weakened zones along which rupture is to be effected. A plurality of symmetrically disposed segments 16, 18, 20 and 22 are defined intermediate the lesser thickness weakening lines in the central portion of the membrane B. The membrane B itself may be perhaps .010 inch in thickness while the dimensions of the weakening lines may be .004 inch deep and .015 wide for example. The inside diameter of the member A may be nominally ⅜ inch with a wall thickness of approximately .050 inch. However, it is apparent that the size can vary to suit the needs of a particular application.

The hollow member C is also tubular in construction or geometrically similar to that of the member A. It comprises a male portion 24 which will slidably interfit within the inner diameter of the member A and a cap 26 which may be permanently added as a part thereof so as to close one end. As seen best in FIGURE 6, the male portion 24 is slightly longer than the overall length of the member A and has a chamfered or beveled end 28.

The cap D is also an integrally molded part and includes a flange portion 30, which is slidably received upon the distal end of the outer wall of the member A, and a crown portion 32 which defines a closure therefor.

Referring now to FIGURE 4, the capsule is filled with separated ingredients, for example, a silver powder 34 within the chamber defined by the interior of the member C. A ball 36 or other weight, such as a needle bearing, may also be encapsulated within the male chamber portion to act as a pestle when the ingredients are combined. The edge 28 abuts against the membrane B when the capsule is in storing or shipping disposition. A proportioned glob of mercury 38 is sealed in the opposite chamber when the cap D is inserted over the distal end of the member A. Both the cap D and the male portion 24 of the member C form tight sliding fits with the respective walls of the member A which they engage so as to prevent any accidental openings during shipment.

Referring next to FIGURE 5, the members A and C are forcibly urged toward each other by applying compressive loads from opposite directions upon the caps 26 and D. This may be accomplished by heavy finger pressure, but it is recommended that the fit is preferably sufficiently tight as to require mechanical leverage. The force exerted by the perimetrical edge 28 of the male member 24 upon the periphery of the membrane B causes the latter to rupture in tension along the weakened zone lines 12 and 14. At this stage, the ingredients 34 and 38 are in partial communication with each other.

In FIGURE 6, the members A and C are fully telescoped with respect to each other and the beveled edge 28 of the male member 24 abuts up against the interior crown 32 of the cap D to form a seal therewith. Meanwhile the petals 16, 18, 20 and 22 of the ruptured membrane B are forced into and captured in the annular "space" between the inner wall of the hollow member A and the outer wall of the male member 24. The silver powder 34 and the mercury liquid 36 are now in full communication. Shaking the telescoped capsule will now permit the intermixed ingredients to be fully triturated with the assistance of the pestle 36. It is to be noted that the petals 16, 18, 20 and 22 when captured between the walls might also act as a supplementary gasket to seal the commingled ingredients within the capsule.

After trituration, the cap D is removed, the intermixed composition (amalgam in this case) emptied and the capsule thrown away.

Referring now to FIGURE 7, there is shown a modification of the instant invention in which an internally threaded cap D1 is used to close the complementary threaded end 40 of tubular member A1. The threaded closure is utilized to facilitate opening of the capsule. The variation is designed to overcome wedging of the petals of the membrane B wtihin the annular space during full telescoping. To the extent that sufficient expansion occurs of the distal end of the female member A, it is possible to cause a force fit of the cap D upon such distal end whereby removal becomes difficult. The relief provided by threading the end 40 and using a complementary cap D1 overcomes this minor difficulty.

In FIGURE 8, the outer wall of the male member C1 is tapered or undercut at 42. When the tapered end 42 has pierced the membrane B and the petals 16, 18, 20, and 22 urged into the annular space between the two telescoping members, the circular wedge of space provided by undercutting or tapering allows the petals to be captured without undue stress upon the distal end of tubular member A.

It is apparent that with the utilization of the capsule of this invention, the ingredients need never be touched by human hands and all formulations can be predetermined and filled without the dentist or other user needing experiment. It is also apparent that other compositions may be formed, such as silicate (white) dental fillings. Also, the disposable capsule can be employed in other fields than dentistry, an illustration of such other field being where epoxy resins are mixed with accelerators and filters to form cements.

Although this invention has been described in considerable detail, such description is intended as being illustrative rather than limiting since the invention may be variously embodied.

What is claimed is:

1. A mixing capsule for separate storage of at least two substances comprising:
   a first hollow member,
   a frangible transverse partition interposed between the ends of said first hollow member and including weakened zones radially extending in an intermediate portion thereof to define a plurality of symmetrically disposed segments therein,
   a second hollow member telescopically received in said first hollow member on one side of said partition,
   cap means closing the distal ends of said respective first and second hollow members,
   the proximal end of said second hollow member having a marginal edge oriented in a plane substantially normal to the telescoping axis of said hollow members, and
   one of said cap means being detachably secured to its corresponding hollow member,
   whereby forcibly urging said hollow members toward each other will cause the marginal edge of said second hollow member to engage the periphery of said partition and rupture the weakened zones of said partition in tension and thereafter capture the torn segments of said partition in the annular space between said hollow members so as to allow the substances to be intermixed and triturated without interference.

2. The capsule of claim 1 wherein said weakened zones are pre-scored in the intermediate portion of said partition to insure equally balanced distribution of the torn segments, thereby maintaining alignment of the telescoped members.

3. The capsule of claim 2 wherein said weakened zones constitute a pair of pre-scored intersecting lines to form quadri-sected segments.

4. The capsule of claim 3 wherein said partition is integrally molded in said first hollow member.

5. The capsule of claim 1 wherein the marginal edge of the proximal end of said second hollow member wipes across the torn segments of said partition.

6. The capsule of claim 1 wherein the marginal edge abuts against the interior of the opposed cap means in fully telescoped position to form a seal therewith to prevent the intermixed substances from escaping from the capsule during trituration.

7. The capsule of claim 1 wherein said hollow members are each tubular in configuration.

8. The capsule of claim 7 wherein the proximal end portion of said second hollow member is tapered.

9. The capsule of claim 7 wherein the detachable cap means is slidably received upon its hollow member.

10. The capsule of claim 7 wherein said cap means is threaded upon its hollow member.

References Cited

UNITED STATES PATENTS

| 1,774,258 | 8/1930 | English. |
| 2,176,923 | 10/1939 | Nitardy. |
| 3,029,987 | 4/1962 | Gronemeyer. |
| 3,326,400 | 6/1967 | Humelin _____ 215—6 |
| 3,344,914 | 10/1964 | Bloom. |

GEORGE E. LOWRANCE, *Primary Examiner.*

U.S. Cl. X.R.

215—6